US008862752B2

(12) United States Patent
Das et al.

(10) Patent No.: US 8,862,752 B2
(45) Date of Patent: Oct. 14, 2014

(54) SYSTEM, METHOD, AND COMPUTER PROGRAM PRODUCT FOR CONDITIONALLY PREVENTING THE TRANSFER OF DATA BASED ON A LOCATION THEREOF (75) Inventors: Sudeep Das, Bangalore (IN); Sameer Shashikant Paranjape, District Ratnagiri (IN); Pramod Sharma, District Champawat (IN)

(73) Assignee: McAfee, Inc., Santa Clara, CA (US)

( * ) Notice: Subject to any disclaimer, the term of this patent is extended or adjusted under 35 U.S.C. 154(b) by 1005 days.

(21) Appl. No.: 11/734,062

(22) Filed: Apr. 11, 2007

(65) Prior Publication Data
US 2013/0246557 A1 Sep. 19, 2013

(51) Int. Cl.
G06F 15/16 (2006.01)
G06F 13/00 (2006.01)
H04L 29/08 (2006.01)

(52) U.S. Cl.
CPC .............. *H04L 67/32* (2013.01); *H04L 67/327* (2013.01)
USPC ........................... 709/229; 709/217; 711/152

(58) Field of Classification Search
USPC .................... 709/217, 229; 711/152
See application file for complete search history.

(56) References Cited

U.S. PATENT DOCUMENTS

| 4,414,628 | A | * | 11/1983 | Ahuja et al. | 715/807 |
|---|---|---|---|---|---|
| 5,983,267 | A | * | 11/1999 | Shklar et al. | 709/217 |
| 5,987,610 | A | | 11/1999 | Franczek et al. | |
| 6,073,142 | A | | 6/2000 | Geiger et al. | |
| 6,128,713 | A | * | 10/2000 | Eisler et al. | 711/159 |
| 6,314,563 | B1 | * | 11/2001 | Agesen et al. | 717/108 |
| 6,389,510 | B1 | * | 5/2002 | Chen et al. | 711/113 |
| 6,460,050 | B1 | | 10/2002 | Pace et al. | |
| 7,000,247 | B2 | | 2/2006 | Banzhof | |
| 7,155,414 | B2 | | 12/2006 | Barritz et al. | |
| 7,178,166 | B1 | | 2/2007 | Taylor et al. | |
| 7,185,238 | B2 | | 2/2007 | Wedel et al. | |
| 7,472,163 | B1 | | 12/2008 | Ben-Yoseph et al. | |
| 7,506,155 | B1 | | 3/2009 | Stewart et al. | |
| 7,592,906 | B1 | | 9/2009 | Hanna et al. | |
| 7,735,116 | B1 | | 6/2010 | Gauvin | |
| 7,774,611 | B2 | * | 8/2010 | Muntz et al. | 713/182 |
| 8,141,127 | B1 | | 3/2012 | Mustafa | |
| 2003/0018878 | A1 | * | 1/2003 | Dorward et al. | 711/216 |
| 2003/0046311 | A1 | | 3/2003 | Baidya et al. | |
| 2003/0125997 | A1 | | 7/2003 | Stoltz | |
| 2004/0083224 | A1 | | 4/2004 | Yoshida | |
| 2004/0083286 | A1 | | 4/2004 | Holden et al. | 709/225 |
| 2004/0103310 | A1 | | 5/2004 | Sobel et al. | |
| 2004/0123127 | A1 | | 6/2004 | Teicher et al. | 713/193 |
| 2004/0143746 | A1 | | 7/2004 | Ligeti et al. | |
| 2004/0250113 | A1 | * | 12/2004 | Beck | 713/201 |

(Continued)

OTHER PUBLICATIONS

Final Office Action from U.S. Appl. No. 11/752,208, dated Nov. 10, 2010.

(Continued)

*Primary Examiner* — Ranodhi Serrao
(74) *Attorney, Agent, or Firm* — Patent Capital Group (57) ABSTRACT

A system, method, and computer program product are provided for conditionally preventing the transfer of data. In use, a request to transfer data is identified. In addition, a location of the data is determined. Further, the transfer of the data is conditionally prevented based on the location.

41 Claims, 7 Drawing Sheets

(56) References Cited

U.S. PATENT DOCUMENTS

| | | | |
|---|---|---|---|
| 2004/0260818 A1 | 12/2004 | Valois et al. | |
| 2005/0027980 A1 | 2/2005 | Peled et al. | |
| 2005/0132225 A1 | 6/2005 | Gearhart | |
| 2005/0257267 A1 | 11/2005 | Williams et al. | |
| 2005/0273600 A1 | 12/2005 | Seeman | 713/160 |
| 2006/0005254 A1 | 1/2006 | Ross | |
| 2006/0072451 A1 | 4/2006 | Ross | |
| 2006/0075494 A1 | 4/2006 | Bertman et al. | |
| 2006/0130139 A1 | 6/2006 | Sobel et al. | |
| 2006/0156408 A1 | 7/2006 | Himberger et al. | |
| 2006/0179476 A1 | 8/2006 | Challener et al. | |
| 2007/0055752 A1 | 3/2007 | Wiegand et al. | |
| 2007/0101432 A1 | 5/2007 | Carpenter | |
| 2007/0107043 A1 | 5/2007 | Newstadt et al. | |
| 2007/0124803 A1 | 5/2007 | Taraz | |
| 2007/0130127 A1 | 6/2007 | Passmore et al. | |
| 2007/0136814 A1 | 6/2007 | Lee et al. | |
| 2007/0143827 A1 | 6/2007 | Nicodemus et al. | |
| 2007/0143851 A1 | 6/2007 | Nicodemus et al. | |
| 2007/0156659 A1 | 7/2007 | Lim | |
| 2007/0220593 A1 | 9/2007 | Burakoff et al. | |
| 2007/0250932 A1 | 10/2007 | Kothari | |
| 2007/0261121 A1 | 11/2007 | Jacobson | |
| 2008/0022382 A1 | 1/2008 | Bradbury | |
| 2008/0064503 A1 | 3/2008 | Oberberger | |
| 2008/0098230 A1 | 4/2008 | Kalibjian | |
| 2008/0148346 A1 | 6/2008 | Gill et al. | |
| 2008/0244690 A1 | 10/2008 | Kulkarni et al. | |
| 2008/0262863 A1 | 10/2008 | Stickley et al. | |

OTHER PUBLICATIONS

Non-Final Office Action from U.S. Appl. No. 11/752,208, dated May 12, 2010.

U.S. Appl. No. 11/752,208, filed May 22, 2007.

USPTO Aug. 12, 2010 Response to May 12, 2010 Nonfinal Rejection from U.S. Appl. No. 11/752,208, filed May 22, 2007.

USPTO Apr. 25, 2011 Response to Nov. 10, 2010 Final Office Action from U.S. Appl. No. 11/752,208.

Office Action Received for the U.S. Appl. No. 11/864,175, mailed on Aug. 6, 2010, 11 pages.

Pre-Appeal Brief for the U.S. Appl. No. 11/864,175, filed Apr. 26, 2011, 7 pages.

Final Office Action Received for the U.S. Appl. No. 11/864,175, mailed on Nov. 2, 2012, 10 pages.

Non-Final Office Action Received for the U.S. Appl. No. 11/864,175, mailed on Mar. 29, 2012, 9 pages.

Final Office Action Received for the U.S. Appl. No. 11/864,175, mailed on Dec. 5, 2011, 9 pages.

Non-Final Office Action Received for the U.S. Appl. No. 11/864,175, mailed on Jun. 21, 2011, 10 pages.

Final Office Action Received for the U.S. Appl. No. 11/864,175, mailed on Feb. 4, 2011, 10 pages.

Response to Non-Final Office Action received for U.S. Appl. No. 11/864,175, filed Jan. 6, 2011, 8 pages.

Response to Non-Final Office Action received for U.S. Appl. No. 11/864,175, filed Sep. 20, 2011, 9 pages.

RCE and Response to Final Office Action received for U.S. Appl. No. 11/864,175, filed Mar. 5, 2012, 9 pages.

Response to Non-Final Office Action received for U.S. Appl. No. 11/864,175, filed Jul. 26, 2012, 10 pages.

USPTO Jul. 11, 2013 Final Office Action from U.S. Appl. No. 11/752,208.

USPTO Aug. 21, 2013 RCE Response to Jul. 11, 2013 Final Office Action from U.S. Appl. No. 11/752,208.

USPTO Dec. 7, 2012 Nonfinal Office Action from U.S. Appl. No. 11/752,208.

USPTO Mar. 7, 2013 Response to Dec. 7, 2012 Nonfinal Office Action from U.S. Appl. No. 11/752,208.

USPTO Dec. 9, 2013 Notice of Allowance from U.S. Appl. No. 11/752,208, 13 pages.

USPTO Mar. 17, 2014 Notice of Allowance from U.S. Appl. No. 11/752,208, 15 pages.

* cited by examiner

SYSTEM, METHOD, AND COMPUTER PROGRAM PRODUCT FOR CONDITIONALLY PREVENTING THE TRANSFER OF DATA BASED ON A LOCATION THEREOF

FIELD OF THE INVENTION

The present invention relates to securing data, and more particularly to restricting the transfer of data.

BACKGROUND

Traditionally, access to data has been restricted in order to prevent undesired use. Such undesired use has included theft, disclosure of confidential information, etc. Access to data has typically been restricted utilizing access control mechanisms. However, such access control mechanisms have been limited to a focus on user privileges and/or activity in determining whether access to data should be prevented, etc. There is thus a need for addressing these and/or other issues associated with the prior art.

SUMMARY

A system, method, and computer program product are provided for conditionally preventing the transfer of data. In use, a request to transfer data is identified. In addition, a location of the data is determined. Further, the transfer of the data is conditionally prevented based on the location.

DETAILED DESCRIPTION

Figure 1:
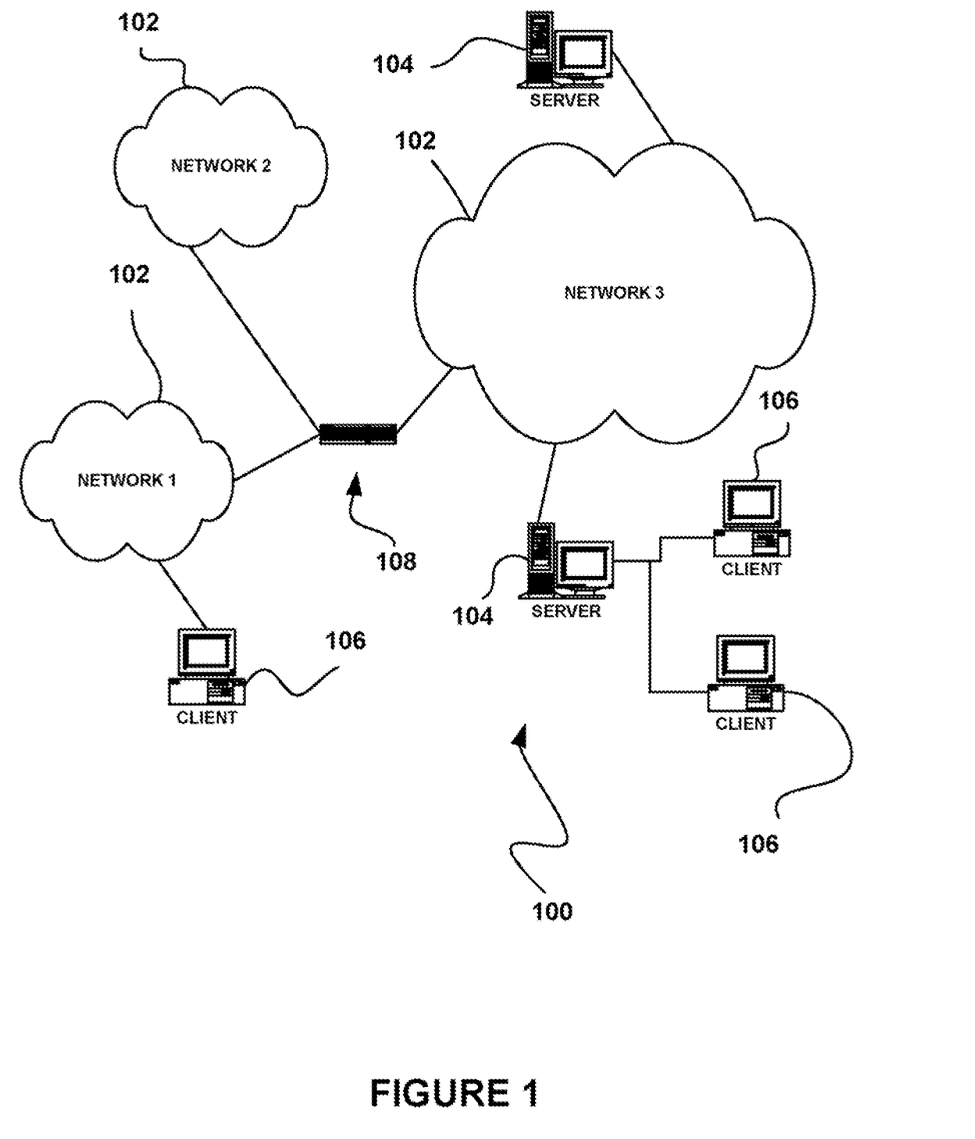
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
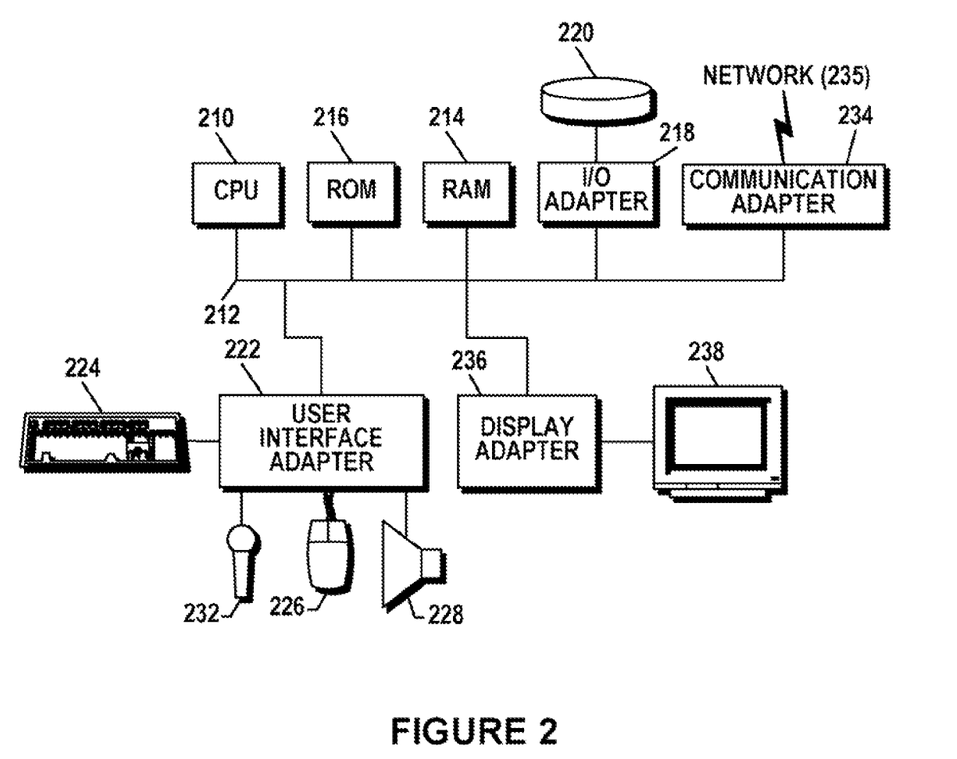
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
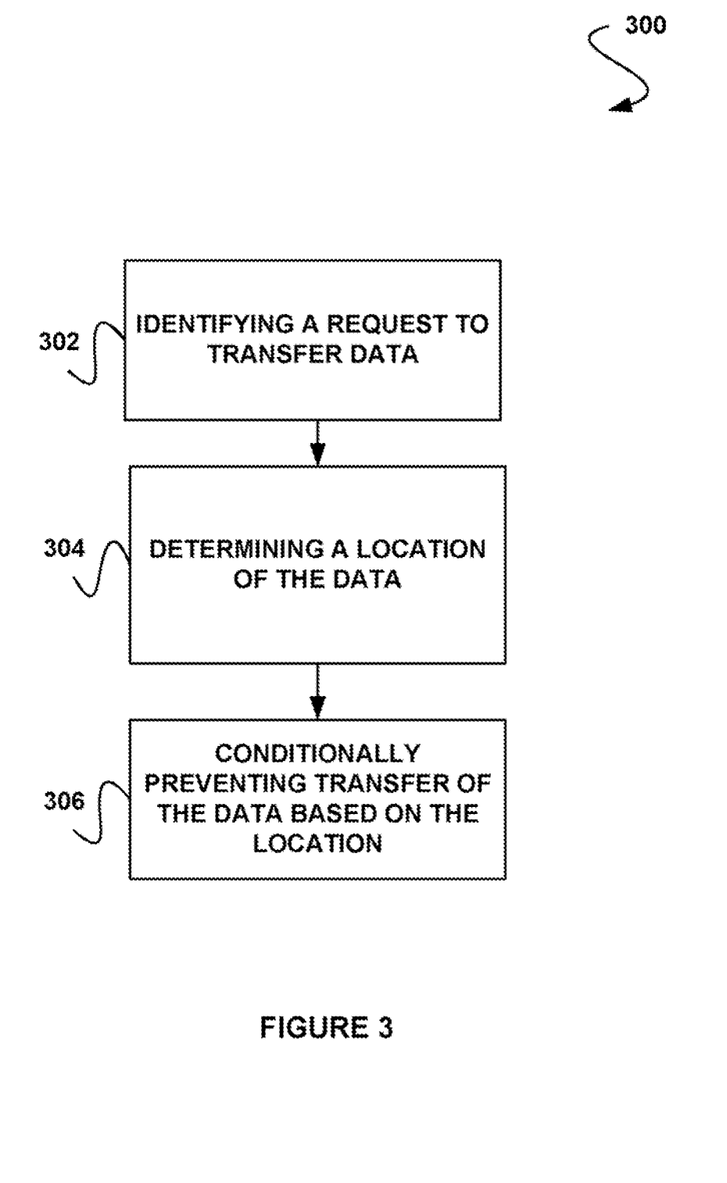
FIG. 3 shows a method for conditionally preventing the transfer of data based on a location thereof, in accordance with another embodiment.

FIG. 3 shows a method for conditionally preventing the transfer of data based on a location thereof, in accordance with another embodiment. As an option, the method 300 may be carried out in the context of the architecture and environment of FIGS. 1 and/or 2. Of course, however, the method 300 may be carried out in any desired environment.

As shown in operation 302, a request to transfer data is identified. In the context of the present embodiment, the data may include any digital data (e.g. computer code, etc.) at least potentially capable of being transferred. Just by way of example, the data may include a digital file. As an option, the data may be located on a device (such as any of the servers and/or clients described above with respect to FIGS. 1 and/or 2) and/or any hardware device externally attached thereto [e.g. external hard drive, external compact disc (CD) drive, etc.].

Additionally, the request to transfer the data may include any request capable of initiating movement of the data from a first location to a second (e.g. different) location. In one embodiment, the request to transfer the data may include a request to remove the data from one location and store the data in another location. In another embodiment, the request to transfer the data may include a request to copy the data from one location and store the copy of the data in another location. Optionally, the request to transfer the data may indicate a destination to which the data is requested to be transferred, and/or simply involve an attempt to leave a predetermined location. Such destination may be designated by the request in any desired manner (e.g. utilizing a destination address, etc.).

In one embodiment, the request to transfer the data may include a request to transfer the data from one location in memory to another location in the memory. Of course, as another option, the request to transfer the data may include a request to transfer the data from one memory volume (e.g. partition, drive, etc.) within a device to another memory volume within the device. Thus, the request to transfer the data may include a request to locally transfer the data (e.g. within the same device, etc).

In another embodiment, the request to transfer the data may include a request to transfer the data from a first device to a second remote (e.g. external, etc.) device [e.g. universal serial bus (USB) drive, printer, computer, etc.]. Accordingly, the request to transfer the data may include a request to remotely transfer the data. Optionally, the first device and the second device may be coupled via a network, such as, for example, any of the networks described above with respect to FIG. 1. Of course, the first device and the second device may also be coupled via cables, a wireless connection, etc. Just by way of example, the request to transfer the data may include a request to transfer the data from a computer to a local printer coupled thereto.

Further, the request may be initiated in any desired manner. For example, the request may be initiated manually or automatically. To this end, the request may be initiated by a user, an application, etc.

As another option, in one embodiment, the request may be initiated remotely (e.g. from a location remotely located with respect to the data). Just by way of example, the request may be initiated utilizing a remote device, where such remote device is in communication with a device on which the data is located via the network. In another embodiment, the request may be initiated locally (e.g. from a location locally situated with respect to the data).

Still yet, a location of the data is determined, as shown in operation 304. In one embodiment, the location may include a physical and/or logical portion of memory (e.g. RAM, ROM, etc.) in which the data is stored. In another embodiment, the location may include an entire device (and/or a hardware device externally connected thereto) on which the data is stored. Still yet, the location may include one or more networks where the data resides. Thus, in various exemplary embodiments, the location may include a particular network, a device on which the data is stored, a particular hard drive where the data is located, a particular folder in which the data is stored, and/or any other location where the data may be located, etc.

Furthermore, in one embodiment, the location may include a protected location. In various embodiments, the location may be determined to be protected based on a protected designation. Optionally, the protected portion may be designated as protected by a user (e.g. administrator, etc.). As another option, the protected location may be capable of storing a plurality of different types and/or instances of data. For example, the protected location may store a plurality of files.

In another embodiment, the location may include an unprotected location. Such unprotected location may optionally include any location that is not protected (e.g. designated as protected, etc.). Just by way of example, the unprotected location may include locations within hardware devices externally coupled to a computer [e.g. external hard drive, USB device, a Compact Disk Read Only Memory (CDROM), etc.].

Moreover, the location of the data may be local or remote with respect to a source of the request. For example, in one embodiment, the location of the data may be associated with (e.g. the same as) a device from which the request was initiated. In another embodiment, the location of the data may be associated with a device that is remote from another device from which the request was initiated. To this end, it may be determined whether the location of the data is protected or non-protected, and/or remote or local. Of course, it should be noted that the location of the data may be determined by identifying any desired characteristic associated with the location of the data.

Additionally, transfer of the data is conditionally prevented based on the location, as shown in operation 306. In one exemplary embodiment, transfer of the data may be prevented by denying the request to transfer the data. As another example, the transfer of the data may be prevented by intercepting and/or terminating a transfer of the data associated with the request. Of course, however, transfer of the data may be prevented in any desired manner that is based on the location of the data.

In one embodiment, the transfer of the data may be conditionally prevented based on rules associated with locations in which the data may potentially be stored. For example, each location may be associated with a particular rule. Optionally, the rules may indicate whether data from a particular location may be transferred to any number of other locations. As another option, the rules may indicate whether data from a particular type of location (e.g. local and protected, local and unprotected, remote and protected, remote and unprotected, etc.) may be transferred to any other location of any possible type.

In another embodiment, transfer of the data may be conditionally prevented based on whether the location of the data includes a predetermined location. Optionally, a list of predetermined locations may be utilized, such that the location of the data may be compared against the list of predetermined locations. In one embodiment, the predetermined locations may include locations from which data may be transferred. Of course, as another option, such predetermined locations may include locations from which data may not be transferred.

Thus, in one possible embodiment, the transfer of the data may be prevented if the location of the data includes a protected location. As another example, the transfer of the data may be not be prevented, and therefore allowed, if the location of the data includes an unprotected location. In this way, data within protected locations may be prevented from being transferred.

In another embodiment, the transfer of the data may conditionally be prevented based on a destination location for the data in addition to the location of the data. In the present embodiment, such destination location may include a location to which the data is requested to be transferred. Further, the destination location may be determined utilizing the request or in any desired manner.

Still yet, in one embodiment, the transfer of the data may be prevented if the location of the data and the destination location of the data are not both included in the list of predetermined locations. For example, if the location of the data includes a predetermined protected location, and the destination location of the data includes a predetermined unprotected location, then the transfer of the data may be prevented. As another example, if the location of data includes a first predetermined protected location, and the destination location of the data includes a second predetermined protected location, the transfer of the data may be allowed. Optionally, such first protected location and second protected location may include different protected locations.

Accordingly, transfers of data may be conditionally prevented based on a location thereof. To this end, transfers of data may not necessarily (but may) be based on privileges of users, parameters of the data, policies, etc. For example, users with privileges which allow access to the data may still be prevented from transferring the data. In this way, data leakage (e.g. of confidential information, etc.) may optionally be prevented, in some embodiments.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
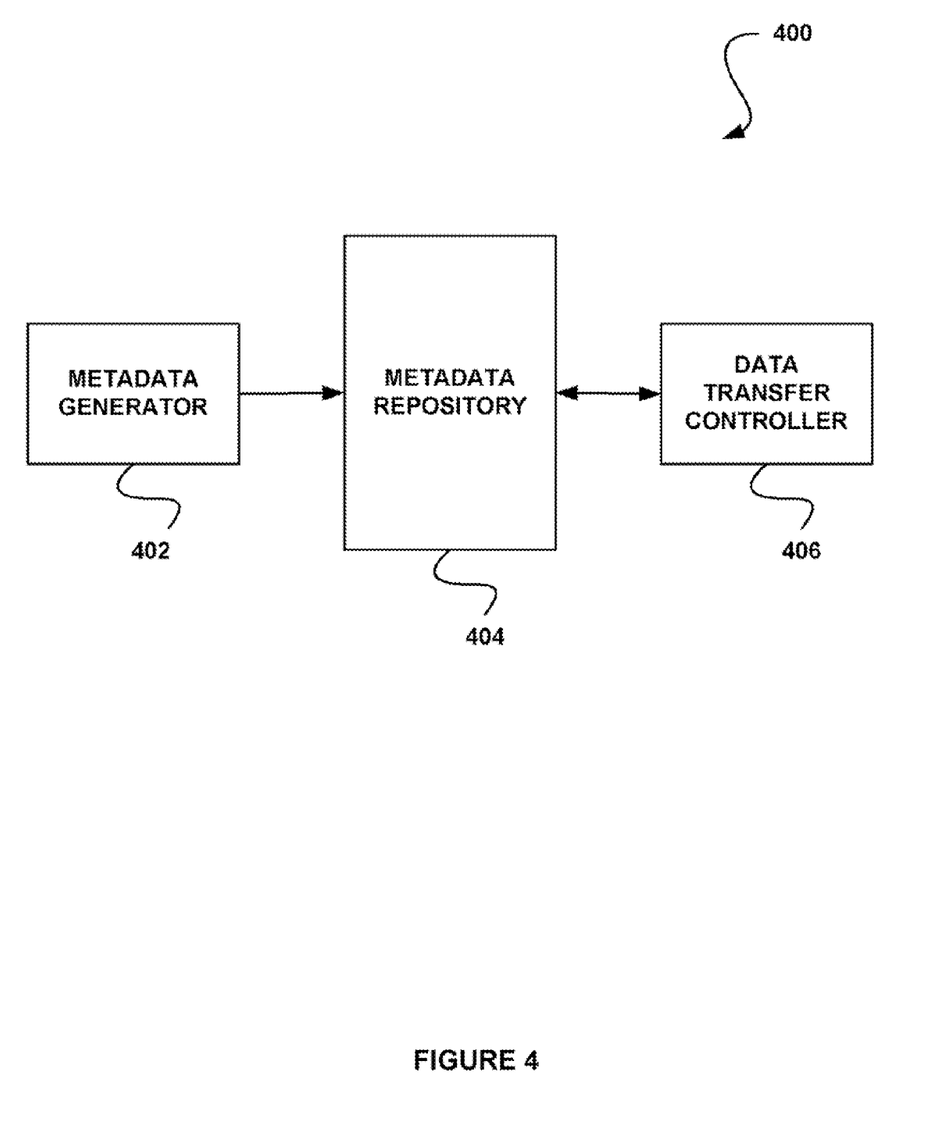
FIG. 4 shows a system for conditionally preventing the transfer of data based on a location thereof, in accordance with yet another embodiment.

FIG. 4 shows a system 400 for conditionally preventing the transfer of data based on a location thereof, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description As shown, a metadata generator 402 is in communication with a metadata repository 404. The metadata generator 402 may include any module capable of generating metadata associated with data. For example, such metadata may be generated by identifying information associated with the data. In various embodiments, the metadata may include a location of the data, a size of the data, an inode of the data (e.g. user and/or group ownership), a type of the data (e.g. extension of the data, etc.), open modes of the data (e.g. modes in which the data is allowed to be accessed, such as via read and/or write requests, etc.), portions of the data previously accessed (e.g. via users, applications, etc.), and/or any other information capable of being associated with the data.

In one embodiment, the metadata generator 402 may generate metadata associated with the data in response to a request to access the data. Thus, the metadata generator 402 may identify requests to access data. For example, such request may include a manual request (e.g. a request from a user, etc.) or an automatic request (e.g. a request from an application, etc.). Just by way of example, the request may include a request by an application to open data.

Thus, as an option, the metadata generator 402 may be located at data access and/or entry points of an operating system kernel. In another embodiment, the metadata generator 402 may be located on a network adapter. In this way, the metadata generator 402 may identify (e.g. intercept, etc.) requests directed toward data, including for example, requests (e.g. to open, read, write, close, etc. the data) issued via system calls and/or network traffic. Of course, it should be noted that the metadata generator 402 may generate the metadata in any manner as desired.

Further, the metadata repository 404 may include any data structure (e.g. database, etc.) capable of storing the metadata generated by the metadata generator 402. Thus, for example, in response to generation of metadata by the metadata generator 402, the metadata generator 402 may transmit the generated metadata to the metadata repository 404. Upon receipt of the metadata by the metadata repository 404, the metadata repository 404 may store such metadata.

Optionally, the metadata repository 404 may store the metadata in association with an identifier of the data from which it was generated. Such identifier may include any value, etc. capable of uniquely identifying the data. Further, in one embodiment, the metadata repository 404 may also store content (e.g. text, images, video, etc.) within the data.

As an option, the metadata repository 404 may store the content utilizing a hash thereof. For example, the metadata repository 404 may hash the content utilizing a hashing algorithm [e.g. secure hash algorithm-1 (SHA1), message-digest 5 algorithm (MD5), etc.], and may store the resulting hash. In this way, a storage capacity utilized in storing the metadata and content associated with a plurality of different instances of data may optionally be reduced.

Of course, it should be noted that, in another embodiment, the content within the data (or a hash thereof) may also be stored in another repository (not shown) separate from the metadata repository 404. As an option, the content may be stored in the other repository in association with an identifier (e.g. unique, etc.) of the data associated therewith. Such identifier may optionally include the same identifier utilized in the metadata repository 404 for identifying the metadata associated with the data.

As yet another option, the metadata generator 402 may determine a length of time in which the metadata is stored in the metadata repository 404. In one embodiment, the metadata generator 402 may remove (e.g. delete, etc.) metadata from the metadata repository 404. In another embodiment, the metadata generator 402 may remove such metadata from the metadata repository 404 in response to a close operation associated with the data. For example, if a request to close the data is issued (such that the data is no longer accessed), the metadata generator 402 may remove metadata associated with such data from the metadata repository 404.

As also shown, the metadata repository 404 is in communication with a data transfer controller 406. The data transfer controller 406 may include any module capable of preventing the transfer of data. Optionally, the data transfer controller 406 may be integrated with the metadata generator 402. For example, the data transfer controller 406 may be located at data access and/or entry points with respect to any number of various network layers.

In one embodiment, the data transfer controller 406 may identify a request to transfer the data. In another embodiment, the data transfer controller 406 may identify and intercept the data associated with the transfer request. Further, the data transfer controller 406 may determine whether to prevent the transfer of such data.

In one embodiment, the data transfer controller 406 may identify (e.g. query, etc.) metadata associated with the data in the metadata repository 404. For example, the metadata repository 404 may identify an originating location of the data and a destination location associated with the request. Furthermore, the metadata repository 404 may indicate whether the originating location and/or destination location are each protected and/or unprotected.

The data transfer controller 406 may further conditionally prevent the transfer of the data to the destination associated with the request based on the originating location of the data. For example, the data transfer controller 406 may prevent transfer of the data if the originating location of the data includes a protected location. As another option, the data transfer controller 406 may conditionally prevent the transfer of the data based on the destination location associated with the request, in addition to the originating location of the data. In this way, the data transfer controller 406 may optionally control the transfer of data based on a location thereof.

Figure 5A:
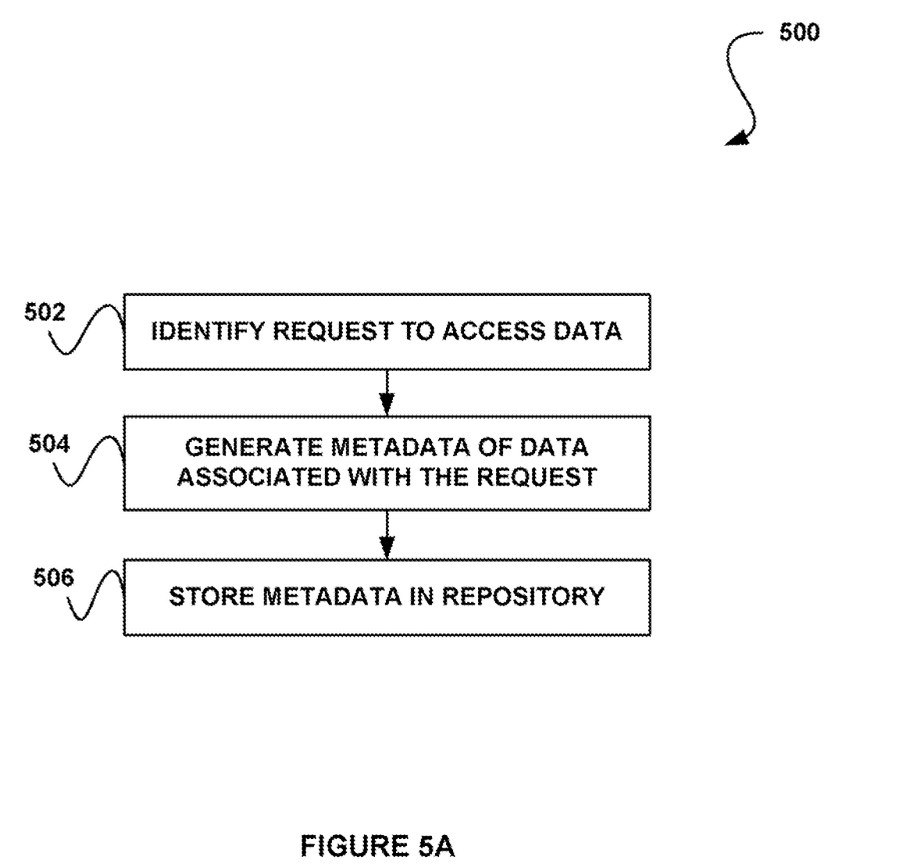
FIG. 5A shows a method for storing metadata associated with data, in accordance with still yet another embodiment.

FIG. 5A shows a method 500 for storing metadata associated with data, in accordance with still yet another embodiment. As an option, the method 500 may be carried out in the context of the architecture and environment of FIGS. 1-4. For example, the method 500 may be carried by the metadata generator 402 of FIG. 4. Of course, however, the method 500 may be carried out in any desired environment. It should also be noted that the aforementioned definitions may apply during the present description.

As shown in operation 502, a request to access data is identified. The request may include a request to open the data, read the data, write to the data, etc. In one embodiment, the request to access the data may be issued by a device and/or application local or remote to the data.

Additionally, metadata of the data associated with the request is generated, as shown in operation 504. The metadata may include any characteristics, information, etc. associated with the data. In various embodiments, the metadata may include a location of the data, an inode of the data, a file size of the data, etc.

Still yet, the metadata is stored in a repository, as shown in operation 506. The repository may include any data structure capable of storing metadata. In one embodiment, the metadata may be stored in the repository in association with an identifier of the data.

Still yet, content within the data (e.g. text, images, video, etc.) may optionally be stored in another repository. As an option, the content may be stored in the other repository utilizing a hash of such content. For example, a hash algorithm may be executed on the content for calculating a corresponding hash. In this way, the hash may be stored in the other repository.

In another embodiment, the content may be stored in the other repository in a plurality of portions. For example, a first portion stored in the other repository may correspond to a first portion of the content associated with the data, a second portion stored in the other repository may correspond to a second portion of the content associated with the data, etc. Such portions may be of any desired size (e.g. 1 kilobyte, etc.). As another option, each of the portions may be of equal size.

Still yet, a hash may be calculated for each of the portions. To this end, the hashes associated with each of the portions may be stored in the other repository. Just by way of example, if the data is 1 megabyte in size, the data may be apportioned into 100 equal sized portions of 10 kilobytes each. Further, a 64 bit hash may be calculated for each portion. In this way, 100 hashes of 64 bits each may be stored in the other repository, and may be utilized in combination for uniquely identifying the content of the data. Of course, while storing the content in the other repository is described herein, it should be noted that the content may also be stored in the repository in which the metadata is stored.

To this end, metadata of data associated with an access request may be stored in a repository. Furthermore, each time a request to access the data is identified, associated metadata may be gathered. In this way, metadata stored in the repository may optionally be updated in response to each access request associated with the data. Of course, as another option, the content within the data may also be updated within the other repository each time an access request associated with the data is identified.

Figure 5B:
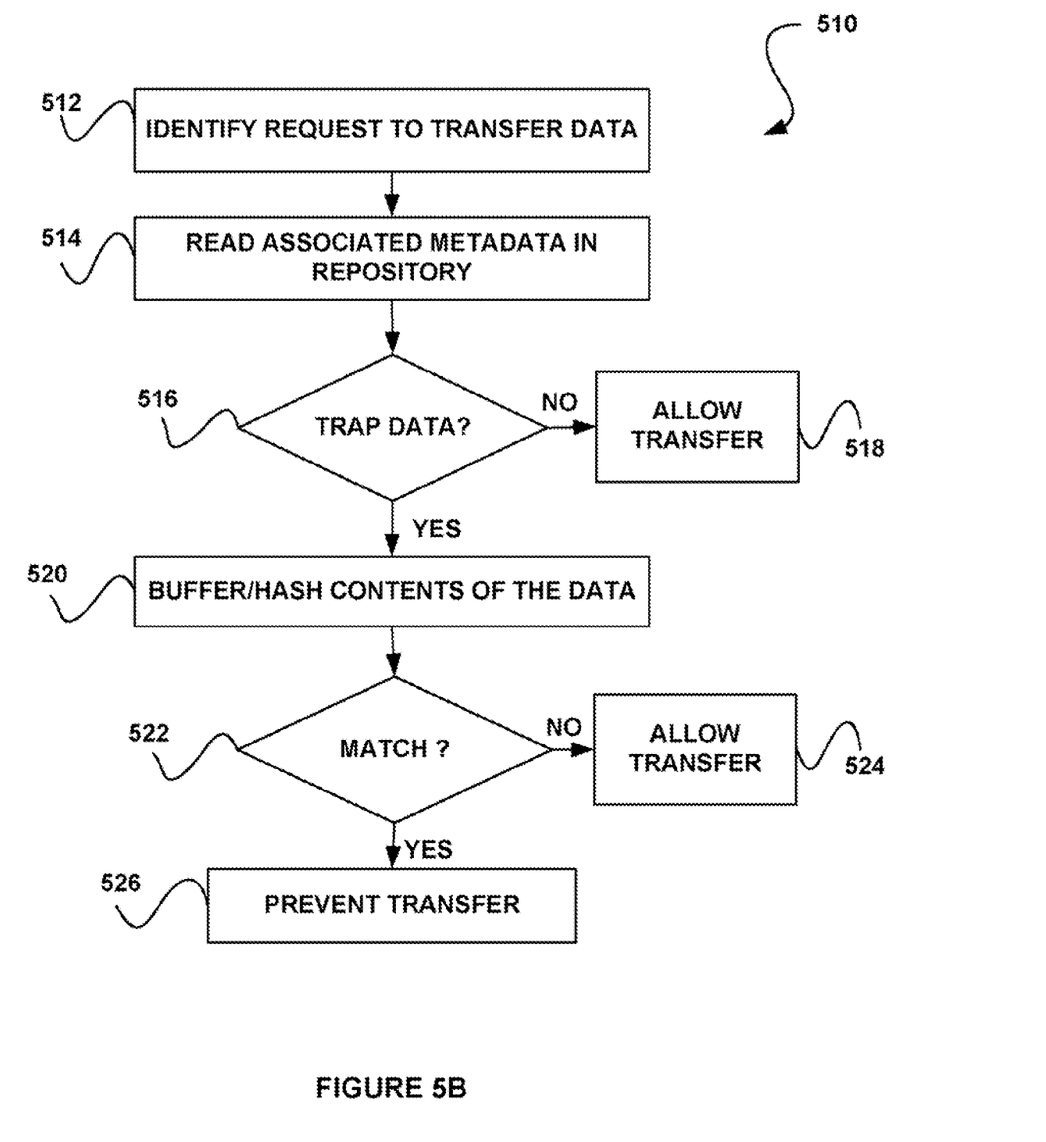
FIG. 5B shows a method for preventing the transfer of data based on metadata associated therewith, in accordance with another embodiment.

FIG. 5B shows a method 510 for preventing the transfer of data based on metadata associated therewith, in accordance with another embodiment. As an option, the method 510 may be carried out in the context of the architecture and environment of FIGS. 1-5A. For example, the method 510 may be carried by the data transfer controller 406 of FIG. 4. Of course, however, the method 510 may be carried out in any desired environment. It should also be noted that the aforementioned definitions may apply during the present description.

As shown in operation 512, a request to transfer data is identified. The request to transfer data may be issued by any desired device. In one embodiment, the request may be issued by a device local or remote to the data.

Additionally, metadata associated with the data is read from a repository, as shown in operation 514. The metadata may indicate an originating location of the data. Further, as shown in decision 516, it is determined whether the data is to be trapped. For example, trapping the data may include intercepting the data, temporarily holding the data, at least temporarily preventing the data from being transferred to the destination location associated with the transfer request, etc. In one embodiment, such determination may be based on the originating location of the data included in the metadata read from the repository.

In another embodiment, the determination may also be based on a destination location associated with the request. In yet another embodiment, the determination may be made by applying rules associated with at least the originating location of the data. Just by way of example, the rules may indicate that the data may not be transferred from a protected originating location. As another example, the rules may indicate that the data may not be transferred from a protected originating location to an unprotected destination location.

Table 1 illustrates one exemplary set of rules associated with originating locations of data and destination locations associated with requests to transfer data. It should be noted that the rules are set forth for illustrative purposes only, and thus should not be construed as limiting in any manner.

TABLE 1

| | To Protected Local Location | To Trusted Remote Location | To Unprotected Local Location | To Non-trusted Remote Location |
|---|---|---|---|---|
| From Protected Local Location | Allow Transfer | Allow Transfer | Prevent Transfer | Prevent Transfer |
| From Trusted Remote Location | Allow Transfer | N/A | Prevent Transfer | N/A |
| From Unprotected Local Location | Allow Transfer | Allow Transfer | Allow Transfer | Allow Transfer |
| From Non-trusted Remote Location | Allow Transfer | N/A | Allow Transfer | N/A |

In the context of Table 1, a protected local location may include any location predetermined to be protected that is local to a device, etc. In addition, an unprotected local location may include any local location not predetermined to be protected. Of course, the unprotected local location may also include a local location predetermined to be unprotected.

Still yet, the trusted remote location may include any location predetermined to be trusted that is remote to the device, etc. To this end, the non-trusted remote location may include any remote location not predetermined to be trusted. As another option, the non-trusted remote location may include a remote location predetermined to be non-trusted.

As shown in Table 1, data transfers from a protected local location to another protected local location may be allowed. Further, data transfers from a protected local location to an unprotected local location and/or non-trusted remote location may be prevented. Also, data transfers from a trusted remote location to a protected local location may be allowed, whereas data transfers from a trusted remote location to an unprotected local location may be prevented.

As additionally shown in Table 1, requests for data transfers between some particular locations may not necessarily be identified. For example, such unidentified data transfers may include data transfers solely between remote locations.

If it is determined that the data is not to be trapped, transfer of the data is allowed. Note operation 518. For example, if the data originates from a location associated with a rule that allows data to be transferred, the data may be transferred. As another example, if a rule indicates that transfers from the originating location to the destination location are allowed, the data may be transferred.

If, however, a rule indicates that the data is to be prevented from being transferred, the data is at least temporarily prevented from being transferred (not shown) and is buffered and/or hashed, as shown in operation 520. In one embodiment, the data may be buffered by being temporarily stored in a buffer. In another embodiment, the data may be hashed by calculating a hash of the contents of the data. As another option, the data may be hashed by calculating a plurality of partial hashes, where each partial hash is associated with a portion of the contents of the data.

Still yet, it is determined whether the hash of the contents of the data matches a predetermined hash in a repository. Note operation 522. Such repository may store predetermined hashes of contents of data which have been previously requested for access. Thus, the hash may be compared to a plurality of predetermined hashes in a repository. Optionally, if a plurality of partial hashes is calculated with respect to the contents of the data, it may be determined whether each of the partial hashes matches any predetermined partial hashes in the repository that are associated with a particular predetermined instance of data.

For example, a first partial hash may be compared with a plurality of predetermined first partial hashes within the repository. If the first partial hash matches at least one of the predetermined first partial hashes, a second partial hash may be compared with any second partial hashes associated with the first partial hashes for which a match was identified. Thus, it may be determined whether all of the partial hashes match predetermined partial hashes associated with a particular predetermined instance of data. As another option, it may only be determined whether a predetermined number of consecutive partial hashes (which may be configurable) match predetermined partial hashes associated with a particular instance of data.

If it is determined that the hash does not match a predetermined hash, the data is allowed to be transferred, as shown in operation 524. Thus, data which is not included in the repository may be allowed to be transferred. If, however, it is determined that the hash does match a predetermined hash, the data is prevented from being transferred, as shown in operation 526. As an option, in response to a determination that the hash does match a predetermined hash, an alert may be generated. Such alert may indicate the data requested to be transferred, a destination location associated with the request, and/or any other information associated with the data. In this way, data located within protected locations may be protected from leakage, unauthorized use, etc.

Figure 6:
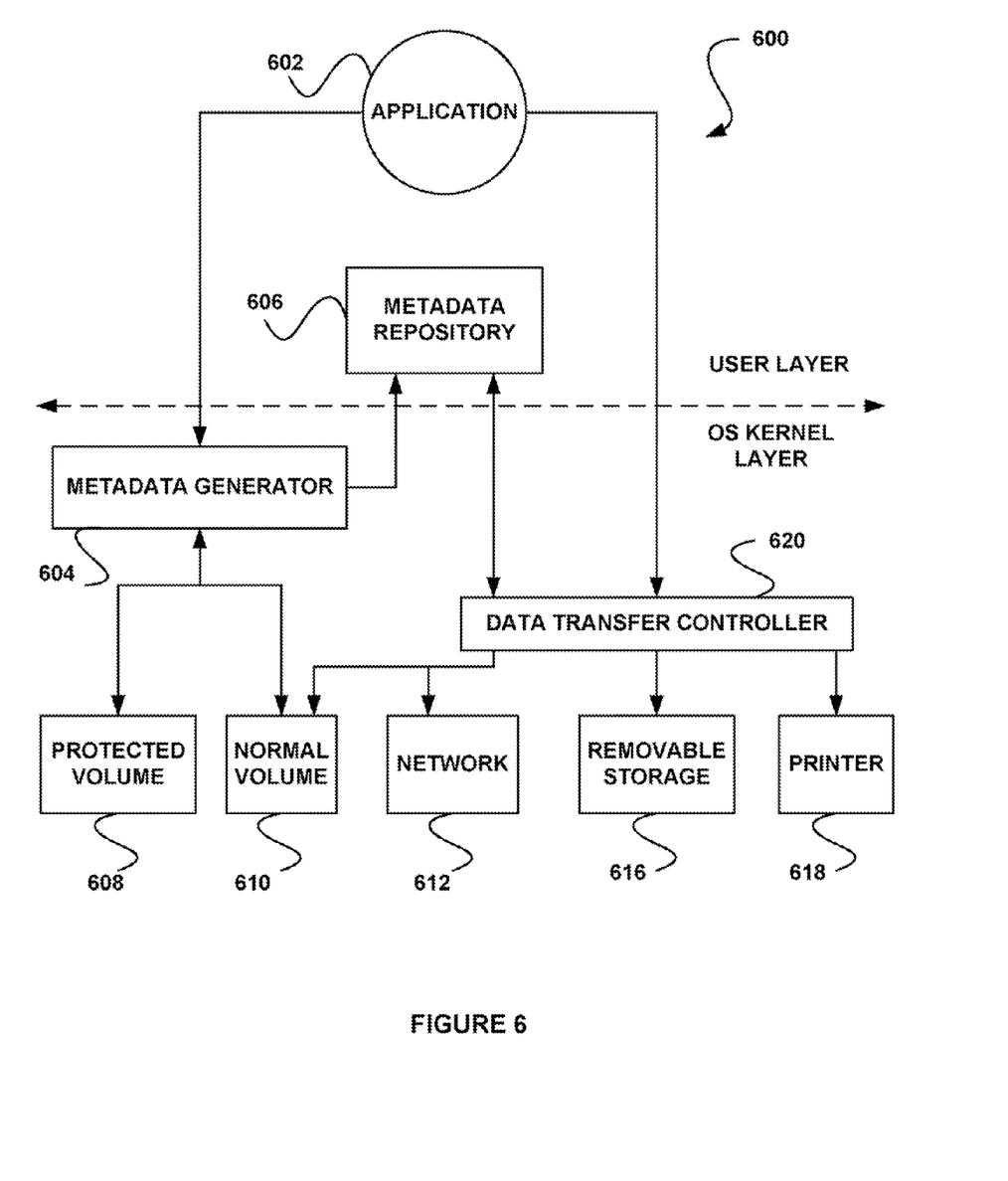
FIG. 6 shows a system for preventing the transfer of data based on metadata associated therewith, in accordance with yet another embodiment.

FIG. 6 shows a system 600 for preventing the transfer of data based on metadata associated therewith, in accordance with yet another embodiment. As an option, the system 600 may be implemented in the context of the architecture and environment of FIGS. 1-5B. Of course, however, the system 600 may be implemented in any desired environment. It should also be noted that the aforementioned definitions may apply during the present description.

As shown, a request to access data issued by an application 602 is identified (e.g. intercepted) by a metadata generator 604. The application 602 may include any computer code capable of issuing an access request automatically and/or in response to a user request. As also shown, the application 602 may be associated with a user layer of a device. In one exemplary embodiment, the access request may include a request to open a file to read data therein.

Further, the metadata generator 604 may be associated with an operating system kernel layer of the same device. Of course, as another option, the application 602 and the metadata generator 604 may also be located on different devices. In response to identification of the access request, the metadata generator 604 generates metadata associated with the data. In one embodiment, the metadata may include a location of the data associated with the access request. For example, as shown, the metadata may identify a protected location 608 in which the data requested to be accessed is located, or may identify an unprotected location 610 in which the data requested to be accessed is located.

Still yet, the metadata generator 604 communicates the generated metadata to a metadata repository 606. In response to receipt of the metadata, the metadata repository 606 stores the metadata. In addition, a hash of the contents of the data is also stored in the metadata repository 606. As an option, the access request may be temporarily prevented during generation and storage of the metadata in the metadata repository 606. Thus, the access request may be allowed after the storage of metadata.

As further shown, the application 602 issues a request to transfer the data. For example, after the access request is fulfilled, the application 602 may issue a request to transfer the accessed data automatically and/or in response to a user request. Just by way of example, the transfer request may include a request to write the data to a device that is external to the device on which the data is located.

A data transfer controller 620 identifies (e.g. intercepts) the transfer request issued by the application 602. In addition, the data transfer controller 620 determines whether to temporarily prevent the transfer of the data. For example, the data transfer controller 620 may identify the metadata associated with the data from the metadata repository 606.

Further, the data transfer controller 620 may temporarily prevent transfer of the data based on a location of the data identified utilizing the metadata. For example, the data transfer controller 620 may apply rules associated with the location of the data, and optionally also a destination location of the data identified via the request, in order to determine whether to temporarily prevent or allow transfer of the data. Thus, if the data transfer controller 620 determines that the data is allowed to be transferred based on the rules, the data is transferred. If, however, the data transfer controller 620 determines that the data is to be prevented from being transferred based on the rules, the data is at least temporarily prevented from being transferred.

In response a determination by the data transfer controller 620 that transfer of the data is to be at least temporarily prevented, the data transfer controller 620 calculates a hash of contents of the data requested to be transferred. In addition, the data transfer controller 620 queries the metadata repository 606 for predetermined hashes located therein. The predetermined hashes may include hashes of contents of data determined in response to access requests for such data.

If the query results in a predetermined hash from the metadata repository 606 matching the calculated hash of the contents of the data requested to be transferred, transfer of the data is prevented. Just by way of example, transfer of the data to a printer (e.g. for printing thereof) may be prevented.

In another embodiment, if the query results in no identified match between a predetermined hash and the calculated hash, the transfer of the data is allowed. For example, transfer of the data to an unprotected location 610 may be allowed. In addition, transfer of the data to a location across a network 612 may also be allowed. Still yet, transfer of the data to removable storage 616 may additionally be allowed.

In one exemplary embodiment, the application 602 may request to open a file, where such file is located at a particular protected location. For example, the request to open the file may be issued utilizing an open call. The metadata generator 604 may identify the request in the kernel and may further store metadata associated with the file in the metadata repository 606. For example, such metadata may include a location of the file, an inode of the file, an open mode associated with the request, a size of the file, etc.

Additionally, a request to read contents of the file may be issued by the application 602. For example, the request may include a request to read a first portion of the file. Such first portion may include any subpart of the contents of the file.

The metadata generator 604 may identify the read request, and associate the read request with the metadata stored in the metadata repository 606. Furthermore, a hash of the contents of the file requested to be read may be calculated. Thus, the hash may be calculated from the first portion of the file if contents of the first portion of the file are requested to be read. Such hash may then be stored in the metadata repository 606 in association with the metadata.

In addition, the data transfer controller 620 may identify a request to write the first portion of the contents of the file to an unprotected location. Thus, the request may include a request to write the first portion of the contents of the file from a protected location to an unprotected location. The data transfer controller 620 may determine whether to allow the write request based on metadata stored in the metadata repository 606 that is associated with the file. For example, the metadata may indicate the protected status of the location of the file.

Furthermore, in response to identification that the file is located in a protected location, the data transfer controller 620 may calculate a hash of the contents of the file requested to be written. The data transfer controller 620 may also query the metadata repository 606 in order to determine whether the calculated hash matches a predetermined hash stored in the metadata repository 606. Since the hash of the first portion of the file was stored in the metadata repository 606 in response to the read request of such portion described above, a match may be identified. To this end, the request to write the first portion of the file to an unprotected location may be prevented.

Still yet, the metadata generator 604 may also identify a request to read the entire contents of the file. The metadata generator 604 may associate the read request with the metadata stored in the metadata repository 606. Also, the contents of the file may be apportioned into two portions, a first portion and a second portion, such that a partial hash associated with each portion may be calculated. Such partial hashes may then be stored in the metadata repository 606 in association with the metadata.

In addition, the data transfer controller 620 may identify a request to write the second portion of the contents of the file to an unprotected location. Thus, the request may include a request to write the second portion of the contents of the file from a protected location to an unprotected location. The data transfer controller 620 may determine whether to allow the write request based on metadata stored in the metadata repository 606 that is associated with the file. For example, the metadata may indicate the protected status of the location of the file.

Thus, in response to identification that the file is located in a protected location, the data transfer controller 620 may calculate a hash of the contents of the file requested to be written. The data transfer controller 620 may also query the metadata repository 606 in order to determine whether the calculated hash matches a predetermined hash stored in the metadata repository 606. Since the hash of the second portion of the file was stored in the metadata repository 606 in response to the read request of the entire file as described above, a match may be identified.

However, as also described above, two partial hashes were stored in the metadata repository in response to the request to read the entire file, where the first partial hash is associated with the first portion of the file and the second partial hash is associated with the second portion of the file. Thus, the hash of the second portion of the contents of the file requested to be written may only match one of the two predetermined partial hashes associated with the metadata of the file. To this end, a determination of whether to allow or prevent the write of the second portion of the file may be inconclusive. Accordingly, the second portion of the file requested to be written may be stored in a buffer.

Moreover, the data transfer controller 620 may identify a request to write the first portion of the contents of the file to an unprotected location. The data transfer controller 620 may determine whether to allow the write request based on metadata stored in the metadata repository 606 that is associated with the file. For example, the metadata may indicate the protected status of the location of the file.

Thus, in response to identifying that the file is located in a protected location, the data transfer controller 620 may calculate a hash of the contents of the file requested to be written (i.e. the first portion of the file). The data transfer controller 620 may also query the metadata repository 606 in order to determine whether the calculated hash matches a predetermined hash stored in the metadata repository 606. Since the hash of the first portion of the file was stored in the metadata repository 606 in response to the read request of the entire file as described above, a match may be identified.

As described above, the hash of the first portion of the contents of the file requested to be written may only match one of the two predetermined partial hashes associated with the metadata of the file. Thus, the data transfer controller may determine whether the second portion of the data is stored in the buffer, indicating that the second portion of the file has been requested to be transferred. In response to identification of the second portion of the file in the buffer, the write requests associated with both the first portion of the file and the second portion of the file may be prevented.

Still yet, the metadata generator 604 may identify a request to close the file in the protected location. In response, the metadata generator 604 may store information associated with such request in the metadata repository 606. For example, the information may be stored with the metadata associated with the file.

Also, the metadata generator 604 may identify a request to close an unprotected file to which contents of the file in the protected location were requested to be written. In response, the metadata generator 604 may remove (e.g. delete) the metadata associated with such file from the metadata repository 604. As another option, the metadata generator 604 may also remove hashes from the metadata repository 604 that are associated with the file.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying, by a processor, a request from a remote computer to transfer data over a network connection;
determining, by the processor, a location from which the data is sought to be transferred;
comparing, by the processor, the location of the data to a list of predefined locations for which data transfers are allowed;
identifying, by the processor, a destination address to which the data is sought to be transferred;
comparing, by the processor, the destination address to the list of predefined locations for which data transfers are allowed;
calculating, by the processor, a hash of the data; and
preventing, by the processor, the transfer of the data if both the location from which the data is sought to be transferred and the destination address to which the data is sought to be transferred are not in the list of predefined locations for which data transfers are allowed, wherein the preventing the transfer of the data prevents data leakage of confidential information.

2. The method of claim 1, wherein the request includes a request to transfer the data from a first location to a second different location.

3. The method of claim 1, wherein the request includes a request to copy the data from a first location and store the copy of the data in a second different location.

4. The method of claim 1, wherein the request to transfer the data is initiated by an application.

5. The method of claim 1, wherein the transfer of the data is prevented if the location of the data includes a protected location.

6. The method of claim 1, wherein the transfer of the data is allowed if the location of the data includes an unprotected location.

7. The method of claim 1, wherein the transfer of the data is conditionally prevented based on at least one rule associated with the location of the data.

8. The method of claim 1, wherein the request to transfer the data is identified utilizing a data transfer controller.

9. The method of claim 8, wherein the data transfer controller is located at a data access point of a device in which the data is located.

10. The method of claim 1, further comprising generating, by the processor, metadata associated with the data.

11. The method of claim 1, further comprising comparing, by the processor, the hash to a plurality of predetermined hashes.

12. The method of claim 1, wherein the location of the data is determined based, at least, on metadata, wherein the metadata includes the location of the data, a size of the data, an inode of the data, a type of the data, open modes of the data, and portions of the data previously accessed.

13. The method of claim 1, wherein the location of the data is determined based, at least, on metadata, wherein the metadata identifies at least one of a protected location in which the data requested to be transferred is located, and an unprotected location in which the data requested to be transferred is located.

14. The method of claim 1, wherein a metadata generator located at a data access point of an operating system kernel intercepts the request to transfer the data and generates metadata.

15. The method of claim 14, wherein the metadata generator transmits the metadata to a metadata repository that includes a database, and the metadata repository stores the metadata in the database in association with a unique identifier of the data.

16. A computer program product embodied on a non-transitory tangible computer readable medium for performing operations, comprising:
identifying a request from a remote computer to transfer data;
determining a location from which the data is sought to be transferred;
comparing the location of the data to a list of predefined locations for which data transfers are allowed;
identifying a destination address to which the data is sought to be transferred;
comparing the destination address to the list of predefined locations for which data transfers are allowed;
calculating a hash of the data; and
preventing the transfer of the data if both the location from which the data is sought to be transferred and the destination address to which the data is sought to be transferred are not in the list of predefined locations for which data transfers are allowed, wherein the preventing the transfer of the data prevents data leakage of confidential information.

17. The computer program product of claim 16, wherein the request includes a request to transfer the data from a first location to a second different location.

18. The computer program product of claim 16, wherein the request includes a request to copy the data from a first location and store the copy of the data in a second different location.

19. The computer program product of claim 16, wherein the transfer of the data is prevented if the location of the data includes a protected location.

20. The computer program product of claim 16, wherein the transfer of the data is allowed if the location of the data includes an unprotected location.

21. The computer program product of claim 16, wherein the transfer of the data is conditionally prevented based on at least one rule associated with the location of the data.

22. The computer program product of claim 16, the operations further comprising generating metadata associated with the data.

23. The computer program product of claim 16, the operations further comprising comparing the hash to a plurality of predetermined hashes.

24. The computer program product of claim 16, wherein the location of the data is determined based, at least, on metadata, wherein the metadata includes the location of the data, a size of the data, an inode of the data, a type of the data, open modes of the data, and portions of the data previously accessed.

25. The computer program product of claim 16, wherein the location of the data is determined based, at least, on metadata, wherein the metadata identifies at least one of a protected location in which the data requested to be transferred is located, and an unprotected location in which the data requested to be transferred is located.

26. A system, comprising:
a memory; and a processor coupled to the memory, the processor for performing operations associated with the system, including:
- identifying a request from a remote computer to transfer data over a network connection;
- determining a location from which the data is sought to be transferred;
- comparing the location of the data to a list of predefined locations for which data transfers are allowed;
- identifying a destination address to which the data is sought to be transferred;
- comparing the destination address to the list of predefined locations for which data transfers are allowed;
- calculating a hash of the data; and
- preventing the transfer of the data if both the location from which the data is sought to be transferred and the destination address to which the data is sought to be transferred are not in the list of predefined locations for which data transfers are allowed, wherein the preventing the transfer of the data prevents data leakage of confidential information.

27. The system of claim 26, further comprising the memory coupled to the processor via a bus.

28. The system of claim 26, wherein the request includes a request to transfer the data from a first location to a second different location.

29. The system of claim 26, wherein the request includes a request to copy the data from a first location and store the copy of the data in a second different location.

30. The system of claim 26, wherein the request to transfer the data is initiated by an application.

31. The system of claim 26, wherein the transfer of the data is prevented if the location of the data includes a protected location.

32. The system of claim 26, wherein the transfer of the data is allowed if the location of the data includes an unprotected location.

33. The system of claim 26, wherein the transfer of the data is conditionally prevented based on at least one rule associated with the location of the data.

34. The system of claim 26, wherein the request to transfer the data is identified utilizing a data transfer controller.

35. The system of claim 34, wherein the data transfer controller is located at a data access point of a device in which the data is located.

36. The system of claim 26, the operations further comprising generating metadata associated with the data.

37. The system of claim 26, the operations further comprising comparing the hash to a plurality of predetermined hashes.

38. The system of claim 26, wherein the location of the data is determined based, at least, on metadata, wherein the metadata includes the location of the data, a size of the data, an inode of the data, a type of the data, open modes of the data, and portions of the data previously accessed.

39. The system of claim 26, wherein the location of the data is determined based, at least, on metadata, wherein the metadata identifies at least one of a protected location in which the data requested to be transferred is located, and an unprotected location in which the data requested to be transferred is located.

40. The system of claim 26, wherein a metadata generator located at a data access point of an operating system kernel intercepts the request to transfer the data and generates metadata.

41. The system of claim 40, wherein the metadata generator transmits the metadata to a metadata repository that includes a database, and the metadata repository stores the metadata in the database in association with a unique identifier of the data.

* * * * *